United States Patent
Sussman

[11] 3,804,492
[45] Apr. 16, 1974

[54] APERTURE VIEWING ZOOM LENS SYSTEM

[75] Inventor: Milton H. Sussman, Amherst, N.Y.

[73] Assignee: American Optical Corporation, Southbridge, Mass.

[22] Filed: Jan. 2, 1973

[21] Appl. No.: 320,369

[52] U.S. Cl............................ 350/184, 350/175 ML
[51] Int. Cl............................................. G02b 15/14
[58] Field of Search ....... 350/184, 186, 43, 175 ML

[56] References Cited
UNITED STATES PATENTS

| | | | |
|---|---|---|---|
| 2,906,172 | 9/1959 | Klemt | 350/184 X |
| 3,030,861 | 4/1962 | Mortimer et al | 350/184 |

*Primary Examiner*—John K. Corbin
*Attorney, Agent, or Firm*—Alan H. Spencer; William C. Nealon

[57] ABSTRACT

A compact three component zoom lens system for aperture viewing permits extended interchangeability of microscope objectives and greater versatility in microscopy techniques by substantially extending the focusing range without substantial changes in magnification.

4 Claims, 1 Drawing Figure

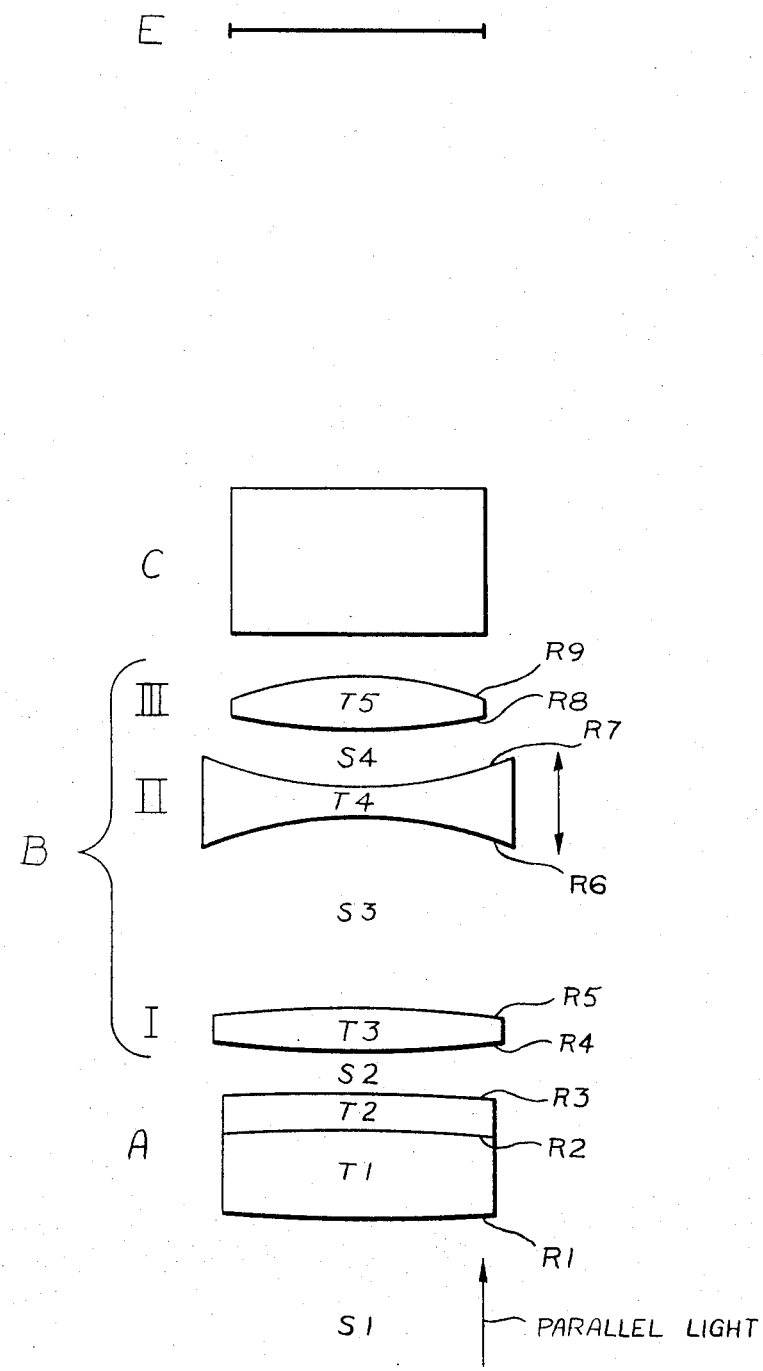

APERTURE VIEWING ZOOM LENS SYSTEM

BACKGROUND OF THE INVENTION

Conventional microscopes are usually designed for either transmitted or incident light microscopy and objectives used therewith normally range from 10X to 100X oil immersion. The rear focal plane of such objectives is usually located near the rear lens at or above the shoulder for a 10X objective and well down in the lens system of a 100X objective. An adjustment of 30mm will usually accomplish the adjustment required for such lenses in a transmitted light microscope and can be provided by a single movable lens, since such instruments can usually accommodate a lens movement of 30mm without significant complications. This lens is normally mounted in a manner which permits the operator to shift it out of the optical path when the object is to be observed and to move the lens to the appropriate position to focus on the rear focal plane of the objective when the rear pupil is to be observed.

Microscopes having greater versatility are becoming increasingly popular and a modern instrument may have as many as six objectives mounted on a turret, built in polarizers and birefringent elements for both phase and amplitude observations, and be adapted for use with either transmitted or incident light. The increased versatility requires the aperture view system be capable of focusing over a range exceeding 70mm, which is impractical with present systems.

OBJECTS OF THE PRESENT INVENTION

It is one object of the present invention to provide an aperture viewing zoom lens system.

It is another object of the present invention to provide an aperture viewing zoom lens system capable of focusing throughout a range of at least 70mm.

It is still another object of the present invention to provide an aperture viewing lens system which can be continuously focused over a 70mm range without substantial changes in the magnification.

BRIEF DESCRIPTION OF THE INVENTION

A compact three component zoom lens system for aperture viewing permits extended interchangeability of microscope objectives and greater versatility in microscopy techniques by substantially extending the focal range without substantial changes in magnification.

FIG. 1 is an optical diagram of a zoom optical system according to the present invention.

DETAILED DESCRIPTION OF THE INVENTION

The drawing is an optical diagram of the preferred form of the present invention wherein B generally designates the zoom lens system positionable in optical alignment with and intermediate to the telescope lens A and binocular system designated generally as C of an infinity correcting microscope with eyepiece focal plane E. The variable distance between the rear pupil D of the objective and the telescope lens A is designated $S_1$. Telescope lens A is a positive double convex doublet having a double convex positive element cemented to a concavo convex element.

The zoom system has three lens components designated I, II and III. Components I and III are stationary optically aligned double convex positive singlets. Component II is a double concave negative singlet having variable spaces designated $S_3$ and $S_4$ and is moved along the optical axis to adjust the focusing distance.

The successive air spaces of the system are designated $S_1$ to $S_4$, respectively, while axial lens thicknesses are designated $T_1$ to $T_5$. Successive radii of curvature are designated $R_1$ to $R_9$, respectively, where the minus sign (−) applies to surfaces whose center of curvature lies on the rear pupil side of their vertices. The refractive indices and Abbe numbers of the glasses in the successive lenses are designated $ND_1$ to $ND_5$, and $\gamma_1$ to $\gamma_5$ respectively.

In the table below system values are presented. Thicknesses, radii and distances are in millimeters. The sum of $S_3$ and $S_4$ is a constant equal to 15.446mm. The values of the telescope lens is not an essential part of the present invention and those skilled in the art are capable of any necessary modification to adapt an infinity correcting microscope having a different telescope lens. A system according to the present invention will provide adjustable focus throughout a range of at least 75mm with minimum variation in the magnification. Magnification will normally vary from about 1X to about 1.3× 1.5 with the system according to the present invention in an infinity correcting microscope having the same telescope lens reported in the table.

| Radius R | Thickness T | Refractive Index ND | Abbe Number $\nu$ | Space S |
|---|---|---|---|---|
| $R_1$=123.382 | | | | |
| | $T_1$=5 | $ND_1$=1.48601 | $\nu_1$=81.5 | |
| $R_2$=−96.794 | | | | |
| | $T_2$=2 | $ND_2$=1.61328 | $\nu_2$=44.3 | |
| $R_3$=−214.445 | | | | |
| | | | | $S_2$=2.7 |
| $R_4$=71.147 | | | | |
| | $T_3$=2.02 | $ND_3$=1.68874 | $\nu_3$=31.2 | |
| | | | | (for $S_1$=81) $S_3$=7.946 |
| | | | | (for $S_1$=86.5) $S_3$=8.446 |
| | | | | (for $S_1$=118.0) $S_3$=11.111 |
| | | | | (for $S_1$=155.6) $S_3$=14.946 |
| $R_5$=−24.875 | | | | |
| | $T_4$=1.556 | $ND_4$=1.74931 | $\nu_4$=35 | |
| $R_7$=24.875 | | | | |
| | | | | (for $S_1$=81) $S_3$=7.500 |
| | | | | (for $S_1$=86.5) $S_3$=7.000 |
| | | | | (for $S_1$=118.0) $S_3$=4.335 |
| | | | | (for $S_1$=155.6) $S_3$=0.500 |
| $R_8$=36.19 | | | | |
| | $T_5$=2.914 | $ND_5$=1.52047 | $\nu_5$=69.7 | |
| $R_9$=−20.481 | | | | |

What is claimed is:

1. An optical lens system of the zoom type having an extremely short length and a focusing range of at least 75mm for use with an infinity correcting microscope system to selectively view the back pupil in a plurality of objectives, said lens system comprising three lenses, said first lens I being a double convex positive singlet, said second lens II being a double concave negative singlet, said third lens III being a double convex positive singlet, all substantially as shown in the attached drawing and in which lens radii (R), thicknesses (T) and spacings (S) are expressed in millimeters and a negative sign indicates lens radii on centers of curvature on the pupil side of the lens according to the following values:

| | Radius R | Thickness T | Refractive Index ND | Abbe Number $\nu$ | Space S |
|---|---|---|---|---|---|
| | $R_4$=71.147 | | | | |
| I | | $T_3$=2.02 | $ND_3$=1.68874 | $\nu_3$=31.2 | |
| | $R_5$=−71.147 | | | | |

| | | | |
|---|---|---|---|
| II | $R_6=-24.875$ | | $S_3=15.446-S_4$ |
| | $T_4=1.556$ $ND_4=1.74931$ $\nu_4=35$ | | |
| | $R_7=24.875$ | | |
| | $R_8=36.19$ | | $S_4=15.446-S_3$ |
| III | $T_5=2.914$ $ND_5=1.52047$ $\nu_5=69.7$ | | |
| | $R_9=-20.481$ | | |

2. The zoom system of claim 1 wherein $S_3$ varies between 7.946 and 14.946.

3. An infinity correcting microscope system including the zoom system of claim 2.

4. An infinity correcting microscope system according to claim 3 having a telescope lens A comprising a double convex singlet cemented to a concavo-convex singlet as shown in the drawing with the following parameters:

| Radius R | Thickness T | Refractive Index ND | Abbe Number $\nu$ | Space S |
|---|---|---|---|---|
| $R_1=123.382$ | | | | |
| | $T_1=5$ | $ND_1=1.48601$ | $\nu_1=81.5$ | |
| $R_2=-96.794$ | | | | |
| | $T_2=2$ | $ND_2=1.61328$ | $\nu_2=44.3$ | |
| $R_3=-214.445$ | | | | |
| | | | | $S_2=2.7$ |

\* \* \* \* \*